(12) United States Patent
Chakra et al.

(10) Patent No.: US 10,924,499 B2
(45) Date of Patent: Feb. 16, 2021

(54) DETECTION OF GENUINE SOCIAL MEDIA PROFILES

(71) Applicant: International Business Machines Corporation, Armonk, NY (US)

(72) Inventors: Al Chakra, Apex, NC (US); Patricia Bui, Henrico, VA (US); Kaji Rashad, Fort Pierce, FL (US); Matias Mendieta, Indian Trial, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 16/215,826

(22) Filed: Dec. 11, 2018

(65) Prior Publication Data

US 2020/0186539 A1    Jun. 11, 2020

(51) Int. Cl.
*H04L 29/06* (2006.01)
*G06F 16/9536* (2019.01)
*G06F 21/64* (2013.01)
*G06F 16/28* (2019.01)

(52) U.S. Cl.
CPC .......... *H04L 63/126* (2013.01); *G06F 16/285* (2019.01); *G06F 16/9536* (2019.01); *G06F 21/64* (2013.01)

(58) Field of Classification Search
CPC . H04L 63/126; G06F 16/285; G06F 16/9536; G06F 21/64
See application file for complete search history.

(56) References Cited

U.S. PATENT DOCUMENTS

| | | | |
|---|---|---|---|
| 8,225,413 B1 | 7/2012 | De et al. | |
| 8,725,672 B2 | 5/2014 | Rostampour et al. | |
| 9,300,676 B2* | 3/2016 | Madhu | H04L 63/12 |
| 10,187,394 B2* | 1/2019 | Bar | H04L 63/0853 |
| 10,459,953 B1* | 10/2019 | Ji | G06Q 50/01 |
| 2011/0307434 A1* | 12/2011 | Rostampour | H04L 51/32 706/45 |
| 2014/0208424 A1 | 7/2014 | Hudack et al. | |
| 2014/0282977 A1* | 9/2014 | Madhu | G06F 16/24578 726/7 |
| 2014/0310346 A1* | 10/2014 | Deng | H04L 63/0861 709/204 |
| 2015/0026173 A1* | 1/2015 | Mishra | G06F 16/9535 707/733 |
| 2015/0195314 A1* | 7/2015 | Reed | G06Q 50/01 709/204 |
| 2016/0086230 A1* | 3/2016 | French | G06Q 30/0245 705/14.44 |

(Continued)

Primary Examiner — Joseph P Hirl
Assistant Examiner — Stephen T Gundry
(74) Attorney, Agent, or Firm — Cantor Colburn LLP; Teddi Maranzano

(57) ABSTRACT

Embodiments include a method, system and computer program product for performing the detection of genuine social media profiles. In some embodiments, a request is received for a target user to join the social network. The request can be used to analyze one or more categories associated with a user profile information of at least one of a requesting user or the target user, and a category score can be calculated for one or more categories. A total score can be calculated from the one or more category scores, and a notification can be provided to the target user indicating the total score.

17 Claims, 9 Drawing Sheets

(56) References Cited

U.S. PATENT DOCUMENTS

| | | | |
|---|---|---|---|
| 2016/0134657 A1 | 5/2016 | Kadashevich et al. | |
| 2017/0039270 A1* | 2/2017 | Bolshinsky | G06F 16/24578 |
| 2017/0289168 A1* | 10/2017 | Bar | H04L 63/102 |
| 2018/0013844 A1* | 1/2018 | Foged | H04L 51/24 |
| 2018/0067945 A1* | 3/2018 | Jain | G06Q 30/0241 |
| 2019/0018835 A1* | 1/2019 | Bhowmick | G06F 16/90332 |
| 2019/0042651 A1* | 2/2019 | Ju | G06F 16/9535 |
| 2019/0095973 A1* | 3/2019 | Byron | G06Q 30/0627 |
| 2019/0158519 A1* | 5/2019 | Frank | H04L 63/1425 |
| 2019/0220545 A1* | 7/2019 | Tripodi | G06Q 50/01 |
| 2019/0294697 A1* | 9/2019 | Boldrin | G06F 16/9535 |
| 2019/0379750 A1* | 12/2019 | Zamora Duran | H04L 51/046 |
| 2020/0014774 A1* | 1/2020 | Keen | G06Q 30/0277 |
| 2020/0084172 A1* | 3/2020 | Chakra | H04L 51/32 |
| 2020/0112582 A1* | 4/2020 | Chakra | G06F 9/542 |
| 2020/0134095 A1* | 4/2020 | Weldemariam | G06F 16/35 |

* cited by examiner

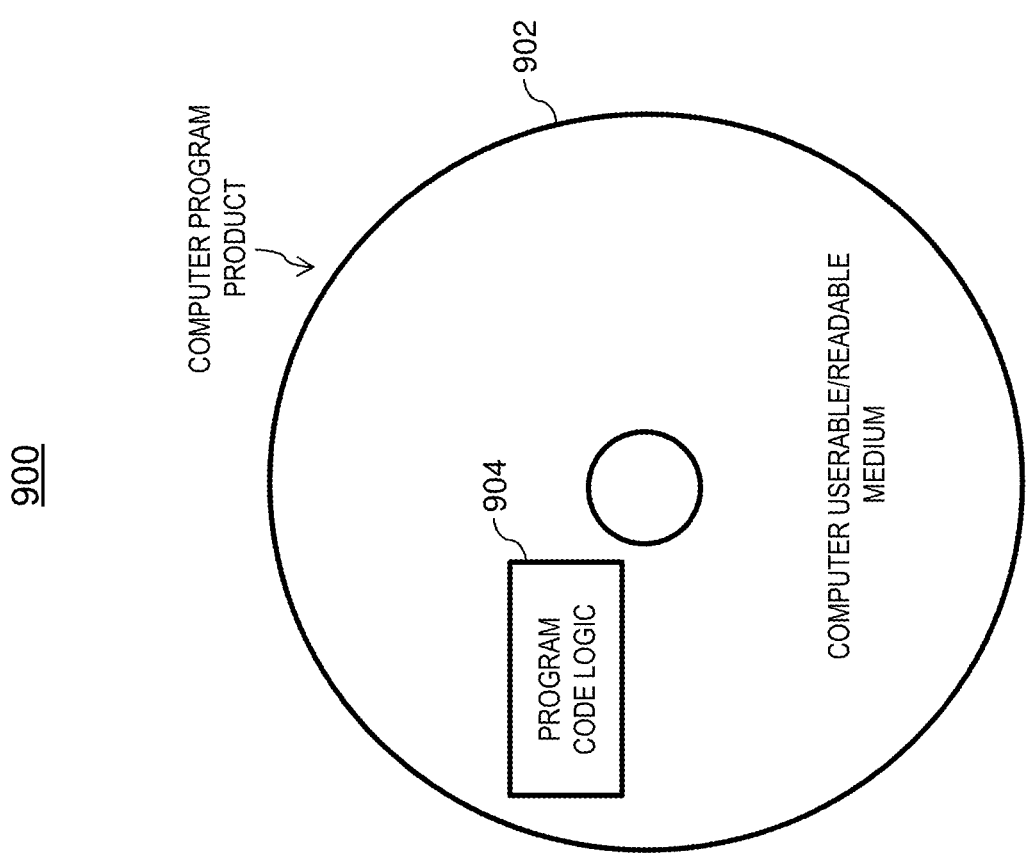

DETECTION OF GENUINE SOCIAL MEDIA PROFILES

BACKGROUND

The present invention generally relates to computing networks, and more specifically to the detection of genuine social media profiles.

Social media platforms allow users to create profiles that represent the user's interests and a network of friends. For example, the user profile can include information about the types of groups the user is a member such as a cycling club, a book club, etc. The user can also include information regarding their current location, employer, pictures, posts, and the like. Oftentimes a user's profile can be used to determine similar groups that the user may be interested in joining. In addition, a user's network of friends can be used to suggest or recommend friends. Because user profiles can be easily created there may be a need to authenticate a user that sends a join request to another before the unsuspecting user accepts the request.

SUMMARY

Embodiments of the present invention are directed to a computer-implemented method for performing detection of genuine social media profiles. A non-limiting example of the computer-implemented method includes receiving from a requesting user, by a processor, a request for a target user, and analyzing one or more categories associated with user profile information of at least one of the requesting user or the target user based at least in part on the request. The computer implemented method also includes calculating one or more category scores for the one or more categories, calculating a total score from the one or more category scores, and providing a notification to the target user based on the total score.

Embodiments of the present invention are directed to a system for detecting genuine social media profiles. A non-limiting example of the system includes a storage medium, the storage medium being coupled to a processor. The processor is configured to receive a request from a requesting user for a target user, and analyze one or more categories associated with user profile information of at least one of the requesting user or the target user based at least in part on the request. The processor is further configured to calculate one or more category scores for the one or more categories, calculate a total score from the one or more category scores, and provide a notification to the target user based on the total score.

Embodiments of the invention are directed to a computer program product for performing detection of genuine social media profiles, the computer program product comprising a computer-readable storage medium having program instructions embodied therewith. The program instructions are executable by a processor to cause the processor to perform a method. A non-limiting example of the method includes receiving a request for a target user, and analyzing one or more categories associated with user profile information of at least one of the requesting user or the target user based at least in part on the request. The computer implemented method also includes calculating one or more category scores for the one or more categories, calculating a total score from the one or more category scores, and providing a notification to the target user based on the total score.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 9 depicts a computer program product in accordance with one or more embodiments of the invention.

Figure 1:
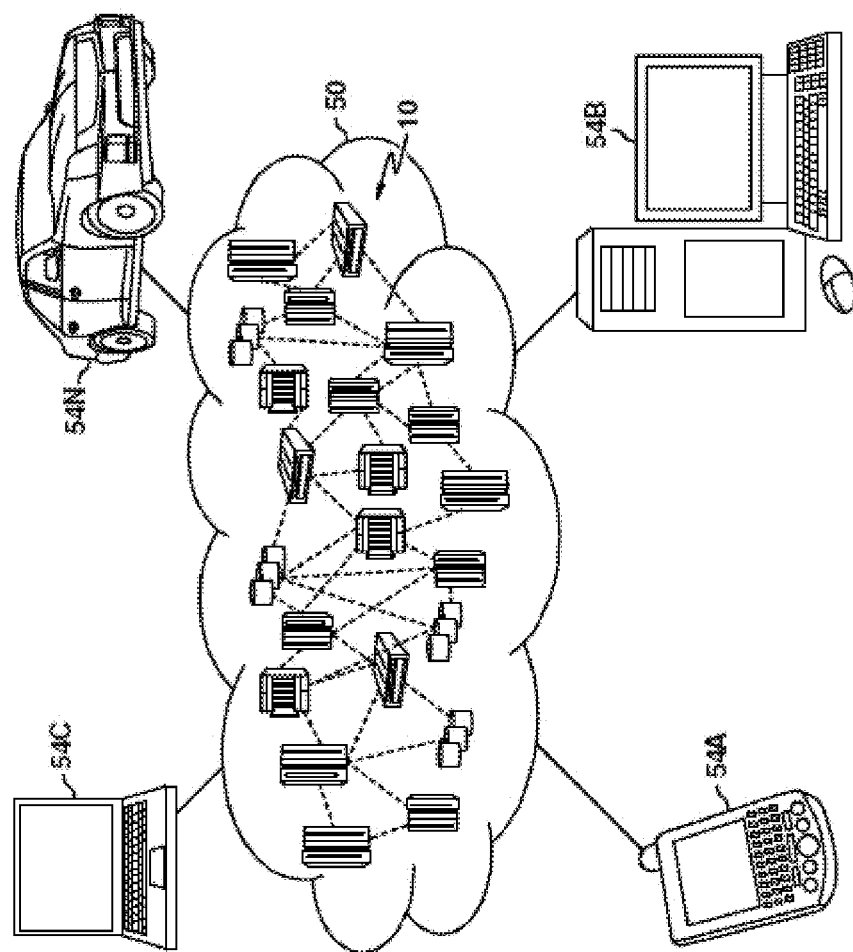
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
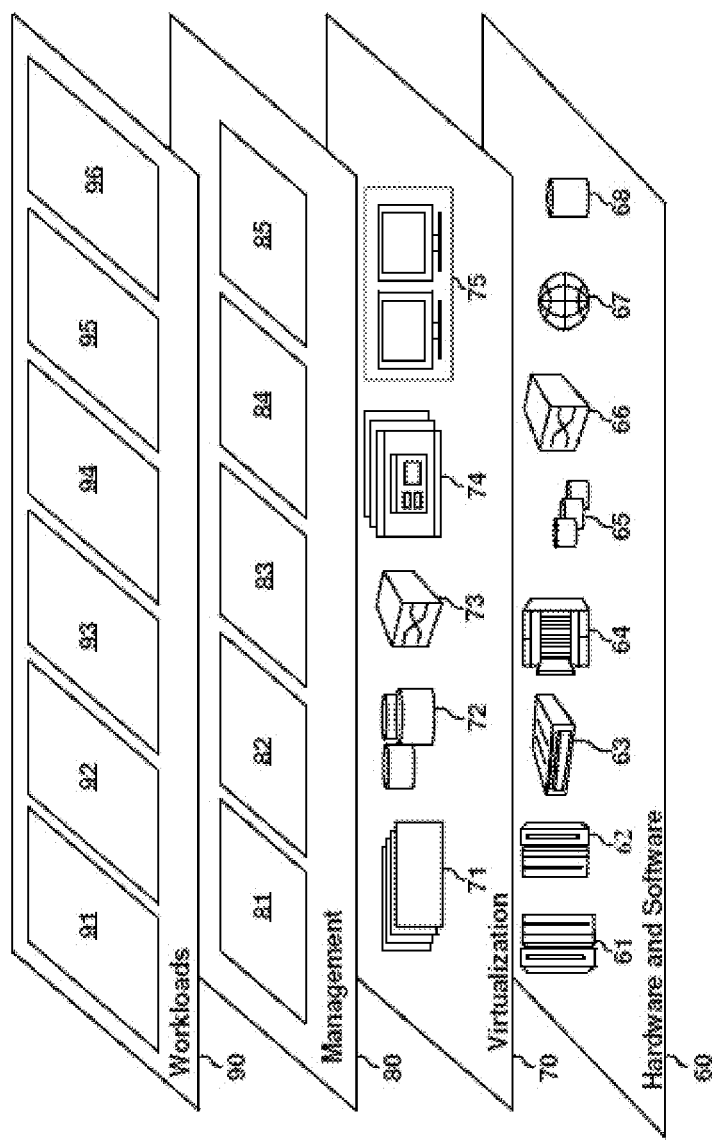
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and action analytics and notifications 96.

Turning now to an overview of technologies that are more specifically relevant to aspects of the invention, social media platforms and networks allow users to create user profiles and interact with other users of the social media platform. The user profiles can include a variety of information ranging from the user's interests, posts, pictures, etc. Users can send join requests to other users to request to add them to their personal network of friends. Once a user is added to the personal network, each of the members can gain access to the other user's published content and profile information that has not been restricted or limited to a specific subset of users.

Because user profiles can be easily created on the social media platforms there may be a need to provide a technique to authenticate a user account and/or provide a warning to a user receiving the request that the requesting user account is fraudulent. In today's environment, it is difficult to identify whether a follow/friend request from a user profile is valid. Some users may create non-genuine user profiles in an attempt to obtain information from other users or provide malicious code to those unsuspecting users that connect with the users. The non-genuine accounts can include accounts that are questionable, fake, not authorized by a user, or invalid/unauthenticated accounts. These non-genuine accounts can include accounts that have been spoofed, replicated, duplicated, imitated, etc.

Turning now to an overview of the aspects of the invention, one or more embodiments of the invention address the above-described shortcomings of the prior art by providing techniques to authenticate user profiles of a social media platform and provide a notification as to the validity of the account. In one example, after a user receives a follow/friend request on a social media platform from another account the user has to decide whether to approve or deny the request. In order to help in this decision process, the method performs a check and determines the likelihood the other account is a fraudulent profile. The user can be notified with a score indicating the likelihood that the account is not a genuine account and the user, with that knowledge, can decide whether or not to accept the request.

Figure 3:
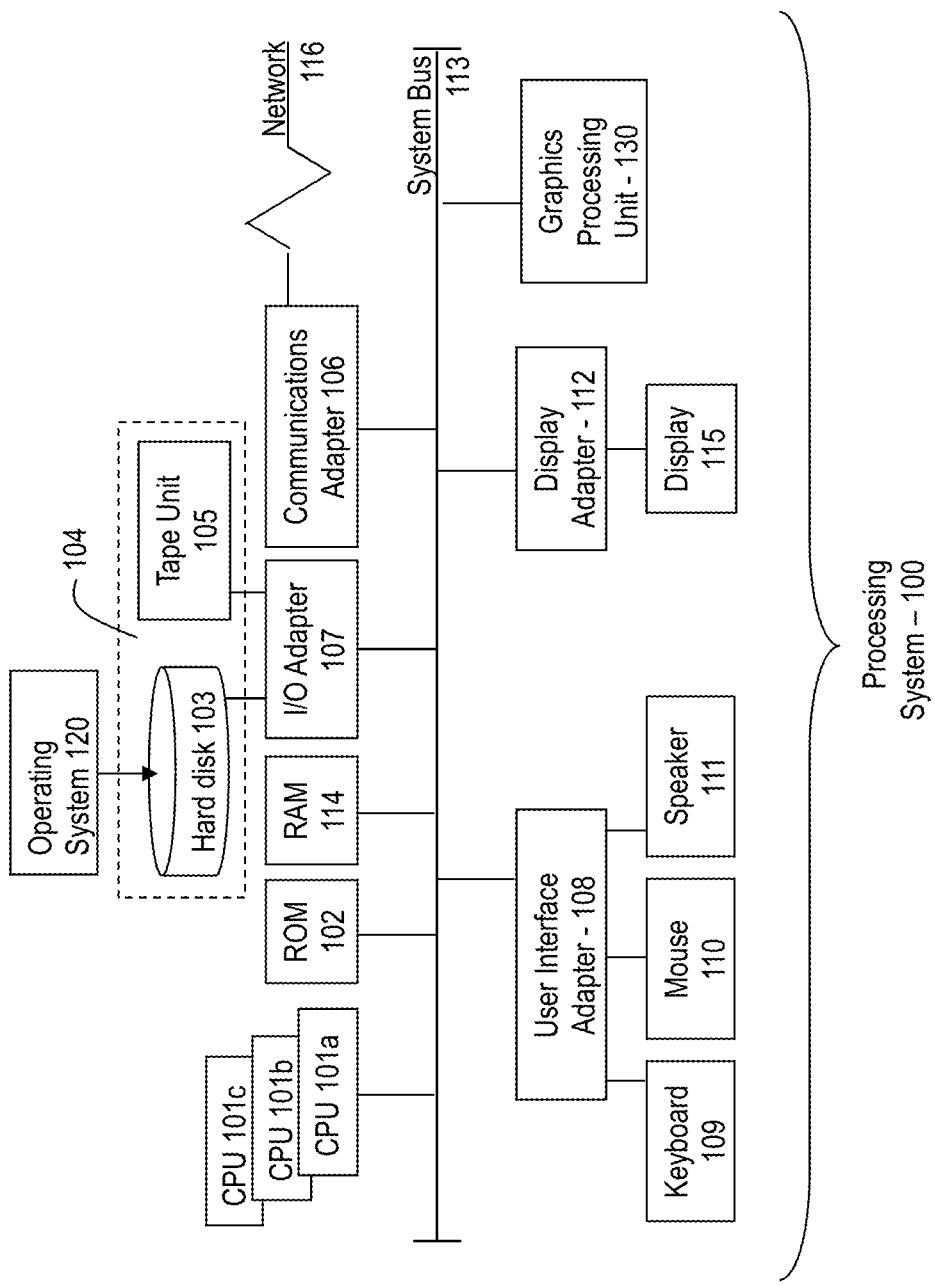
FIG. 3 depicts a block diagram of a computer system for use in practicing the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112.

A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Figure 4:
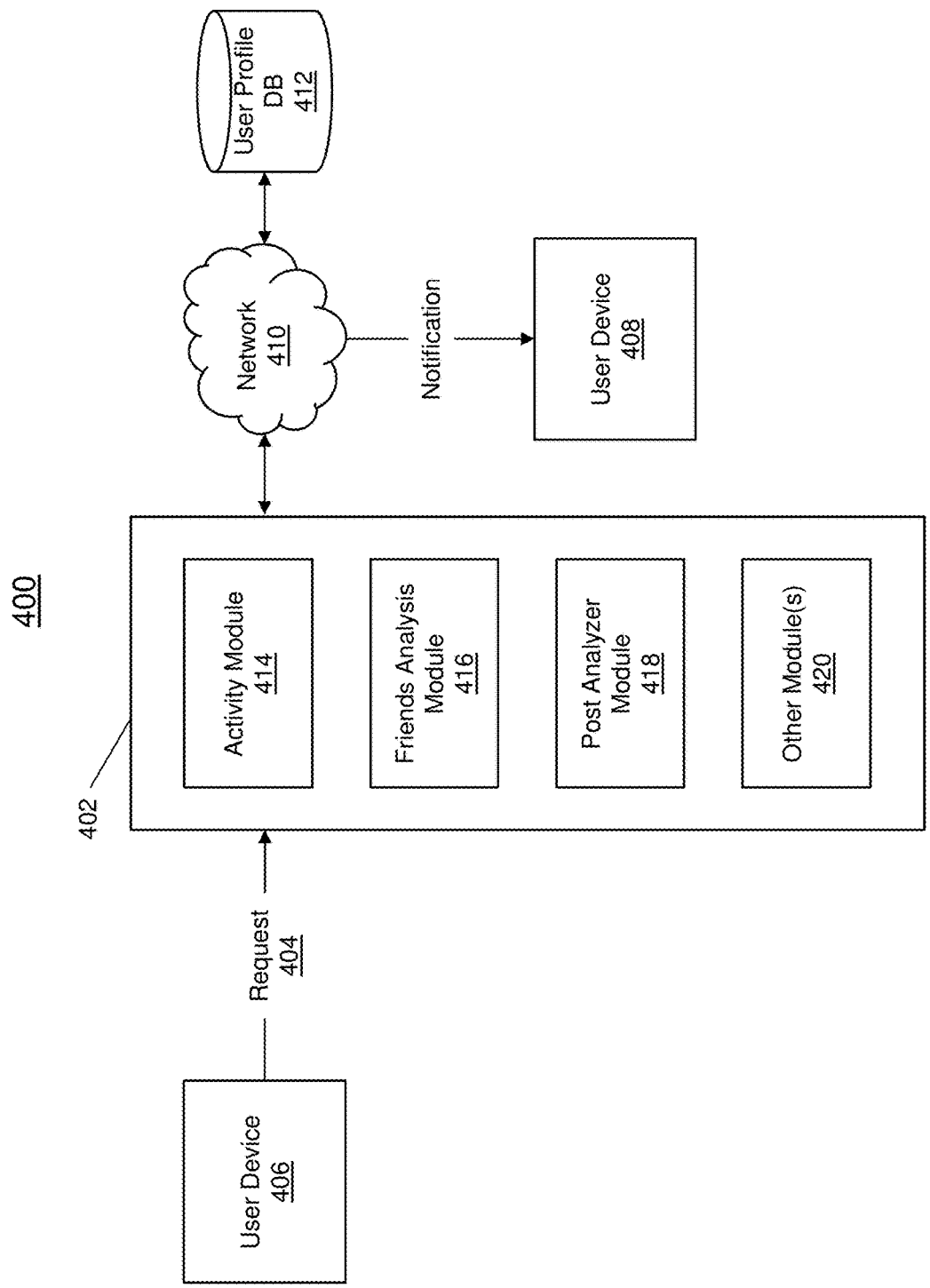
FIG. 4 depicts a block diagram illustrating one example of a processing system for practice of the teachings herein.

Turning now to a more detailed description of aspects of the present invention, FIG. 4 depicts a system 400 for operating a genuine social media profile detector according to embodiments of the invention. System 400 includes a server 402 that includes a plurality of hardware/software components for performing various processes. The server 402 is configured to process requests 404 such as a join request from a user device 406 that is transmitted to another user device 408 over a network 410. The requests 404 can include information such as the requesting user's ID and the target user's ID. The IDs are used to obtain user profile information from a user profile database 412 that will be analyzed by the server 402 in accordance with one or more embodiments of the invention. As shown in FIG. 4, the server 402 includes a plurality of modules 414-420 but it should be understood the server 402 is not limited by the illustrated example. The modules 414-420 are configured to analyze various categories of information associated with user profiles. The categories can include but are not limited to user activity, associated friends, and user posts/messages. The categories can also include other categories that can be selected and configured by an administrator.

Server 402 includes an activity module 414 that is configured to analyze the activity associated with the requesting user profile. The activity includes determining the number of messages that have been transmitted from the user profile and the number of messages that have been received by the user profile. The number of outgoing messages is compared to the number of incoming messages to determine a ratio.

In the event it is determined that a majority of the messages are transmitted from the user profile, it is likely a non-genuine user profile that is spamming other users. In one example, a configurable threshold value can be configured and compared to the ratio to determine whether it is likely the user profile is a non-genuine user profile that is spamming the other users or soliciting membership into other user social networks. An activity category score for the activity category is calculated and is used to calculate a total score.

Server 402 includes a friends analysis module 416 that is configured to determine if any relationships exist between a set of friends of the requesting user and the target user. In addition, the friends analysis module 416 is also configured to correlate the set of friends within the requesting user's profile. For example, the relationship among the friends of the requesting user can be analyzed to determine whether the appearance the friends have common interests or groups such as having attended schools, social clubs, etc. In the event a very small percentage or a low number of relationships are determined, it is more likely that a non-genuine account sent the request. A sub-category score is calculated and contributes to the friends analysis category score.

Server 402 includes a post/message analyzer module 418 that is configured to analyze the posts associated with the requesting user profile account. For example, the post/message analyzer module 418 can perform sentiment analysis or natural language processing on the posts as described below.

The post/message analyzer module 418 is configured to calculate post sub-category scores that contribute to the post category score. In one or more embodiments of the invention, the sub-category scores can be weighted. In other embodiments, each of the sub-category scores can have different weights among the different sub-category scores.

It should be understood the server 402 can include additional processing modules 420 that can be configured to perform further analysis on other categories of information available in the social network. It should also be understood that any combination or a different combination of categories can be analyzed in the embodiments of the invention.

Server 402 is configured to generate a message/notification including a score that indicates a probability that the user profile from which the request is transmitted from is from a non-genuine account. The total score can be provided to the user.

Figure 5:
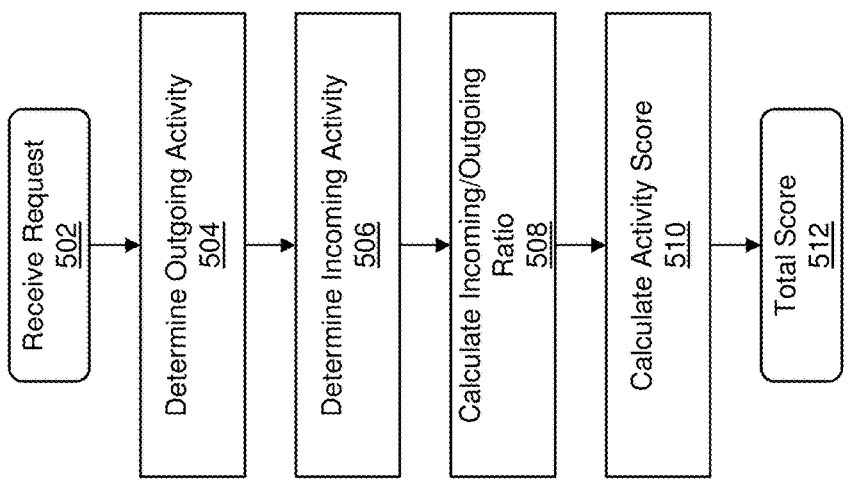
FIG. 5 depicts a flowchart of an activity analysis process in accordance with one or more embodiments of the invention.

FIG. 5 depicts an activity analysis process 500 (hereinafter referred to as "process 500") in accordance with one or more embodiments of the invention. In some embodiments of the invention, the process 500 is executed in an activity analysis module 414 as shown in FIG. 4. The process 500 begins after receiving a request at block 502. The request, such as a join request, can be transmitted to a user and processed by the server 402. At block 504, the server 402 can obtain the user profile information of the user sending the request and analyze the activity of that user. For example, the activity can include the sent and received messages, posts, requests, etc. At block 504 the outgoing activity is determined, and at block 506 the incoming activity is determined. At block 508, the process 500 calculates an outgoing/incoming ratio. The ratio can be compared to a configurable threshold which can be used as an indicator that a user profile is a non-genuine account. Oftentimes, a non-genuine user profile will send out a high volume of messages, requests, etc. to gain access to other user accounts. In the event, the ratio exceeds a threshold it may be determined that the account is a non-genuine account. At block 510, a category score for the activity of the user profile is determined. In one or more embodiments, the ratio can be mapped to a score. In addition, the activity category score can be used to determine a total score at block 512. In some embodiments, the category score is weighted prior to being added to the total score 512.

Figure 6:
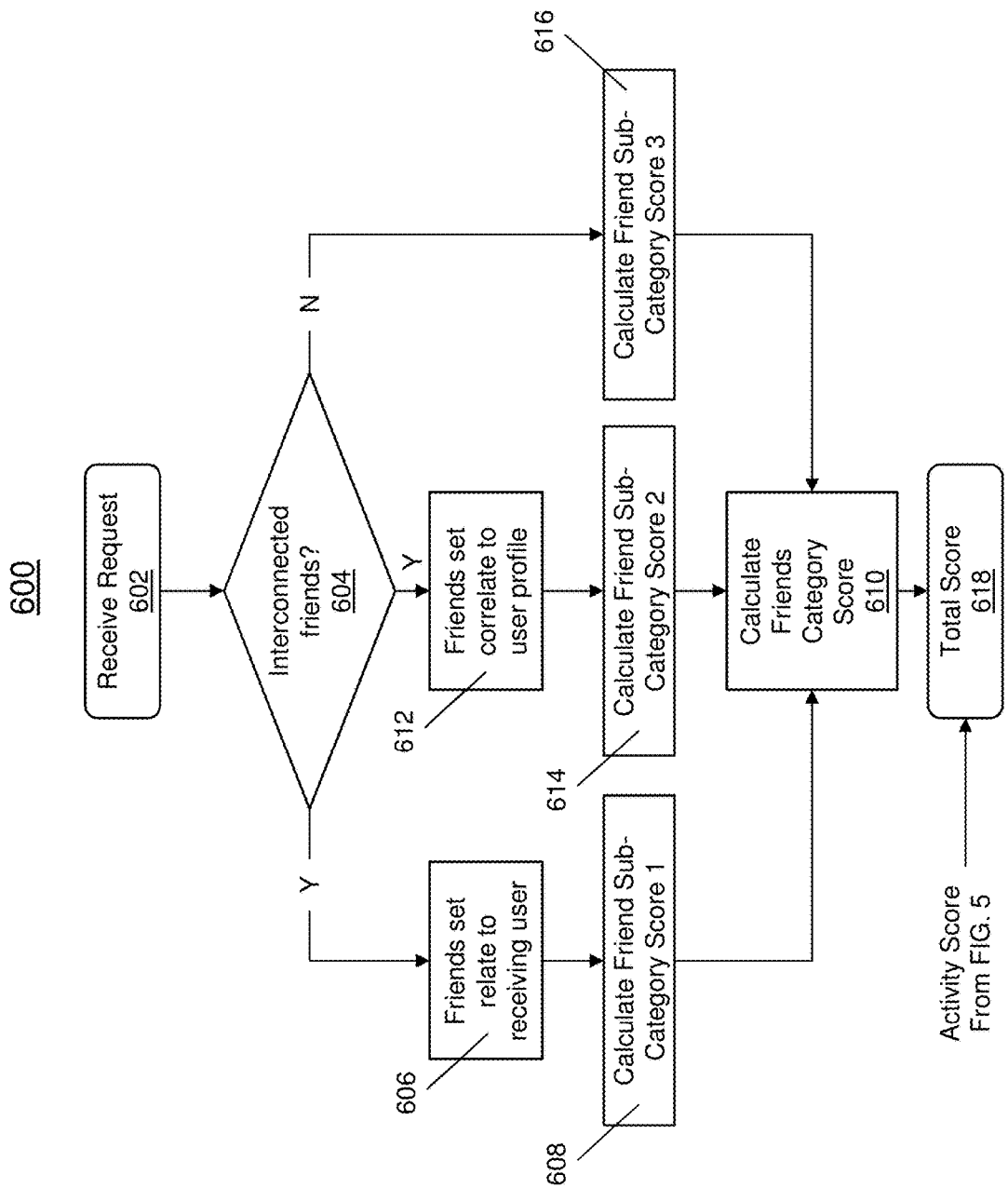
FIG. 6 depicts a flowchart of a friends analysis process in accordance with one or more embodiments of the invention.

FIG. 6 depicts a friends analysis process 600 (hereinafter referred to as "process 600") in accordance with one or more embodiments of the invention. In some embodiments of the invention, the process 600 is executed in the friends analysis module 416 as shown in FIG. 4. The process 600 begins responsive to receiving a request at block 602. At decision block 604, the process 600 determines whether the friends are interconnected or have a relationship that may explain why a particular target user is receiving a request from a requesting user. In one or more embodiments, the requesting user's friends are analyzed to determine if there are any interconnected relationships. For example, a group of friends (friends set) that have a common interest in a particular sport, school, or social club can be determined.

In some embodiments, if an interconnected group of friends is determined (the "yes" branch), at block 606 a friend set of the requesting user and a friend set of the targeted user can be analyzed. The degree to which a number of overlapping friends of the friend sets can be determined at block 606 and assigned a sub-category score 1 at block 608. The sub-category score 1 can be based on a percentage of friends for the requesting user or the targeted user that overlap. The determined percentage can be mapped to a particular score such as a score between 1-10, 1-100, or other scale. The sub-category score 1 can be used at block 610 to calculate a category score for the friends category.

In some embodiments, if it is determined that the requesting user has interconnected friends (the "yes" branch), at block 612 the friends set are correlated to the requesting user's profile. That is, the friends set of the requesting user can be compared to the user profile information. For example, if the friends set indicates the friends are interested in a sport the user profile information will be analyzed to determine if the requesting user is also interested in the sport. In another example, if the friends set is associated with a school or lives in a particular region the requesting user's profile information will be analyzed to determine if there are any relationships or common elements with the friends set. Any characteristics or attributes of the friend set and the requesting user profile information can be compared to determine overlapping elements. The more characteristics that are in common the higher a friend sub-category score 2 is assigned at block 614. The fewer characteristics that are in common, the lower the friend sub-category score 2 is assigned at block 614.

In some embodiments, if it is determined that no interconnected friends exists (the "no" branch), a sub-category score 3 is assigned at block 616 and is provided to block 610 to further calculate a friends category score. Responsive to calculating the friends category score, the friends category score is provided to be added to the total score 618. In one or more embodiments of the invention, the sub-category scores can be weighted to calculate the friends category score. In addition, the friends category score can be weighted when calculating the total score.

Figure 7:
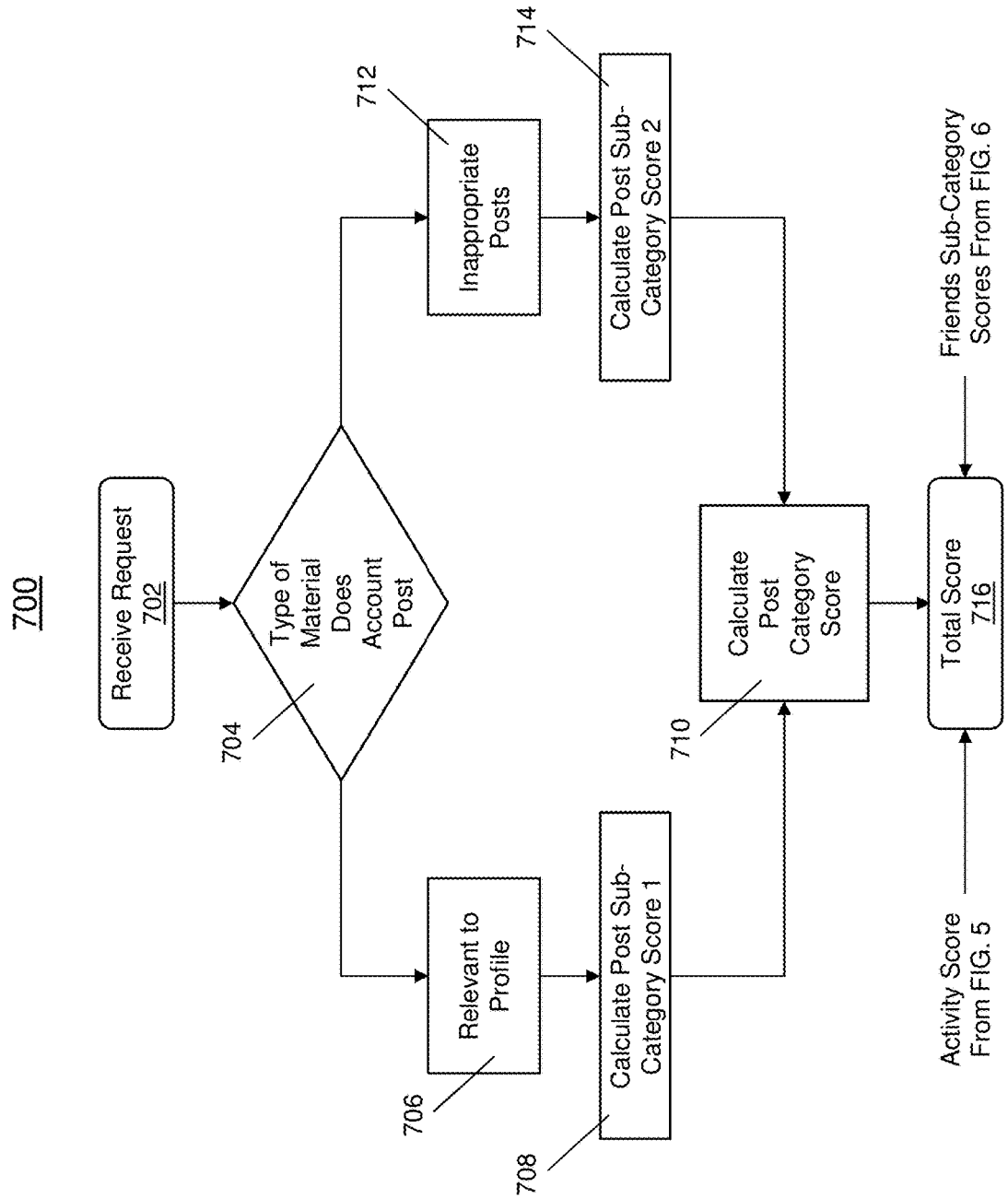
FIG. 7 depicts a flowchart of a post analysis process in accordance with one or more embodiments of the invention.

FIG. 7 depicts a post/message analysis process 700 (hereinafter referred to as "process 700") in accordance with one or more embodiments of the invention. In some embodiments of the invention, the process 700 is executed in a post/message analysis module 418 as shown in FIG. 4. Responsive to receiving the user request at block 702, the process 700 analyzes the information and posts that are associated with the user profile that sent the user request. In one or more embodiments of the invention, a module may be provided by an application program interface (API) or Natural Language Understanding API to analyze the information and posts that are associated with the user profile. The Natural Language Understanding API allows computers to interpret and manipulate human language. In some embodiments, the module can be configured to parse sentences to process the relationship between words in the parsed sentences. The results of the Natural Language Understanding process can be used to compare the information and posts that are available on the user profiles.

After processing the post/message information of the requesting, the type of material the user account publishes is determined at block 704. At block 706, the process 700 determines whether the posts are relevant to the information provided in the user profile transmitting the request. For example, the user profile can indicate that a user has attended a particular university, works for a specific employer, or lives in a certain area. If there are no posts that are related to any of the above pieces of data, it is more probable that the account is a non-genuine account.

At block 708, the process 700 calculates a score for the post/message analysis category. The score is aggregated with the other category scores to determine a total score. For example, the total score is determined by adding the category scores from the activity category from FIG. 5 and the friends category from FIG. 6 to the post/message category score.

In some embodiments, at block 712 the process 700 determines whether inappropriate posts have been published. In some events, inappropriate posts have been associated with fraudulent accounts. The posts can be determined to be inappropriate from having been reported by other users or some other technique. At block 714, the post sub-category score 2 is calculated and provided to block 710. Finally, the post category score is provided to block 716 to calculate the total score. In one or more embodiments of the invention, one or more of the activity score from FIG. 5 or the friends category score from FIG. 6 is added to the total score at block 716. In addition, the scores can be weighted prior to being added to the total score at block 716.

It is to be understood the each of the categories scores can be calculated from a plurality of sub-category scores. A different number of subcategories scores can be used and are not limited by the categories/sub-categories as provided in the illustration in FIGS. 4-7.

Figure 8:
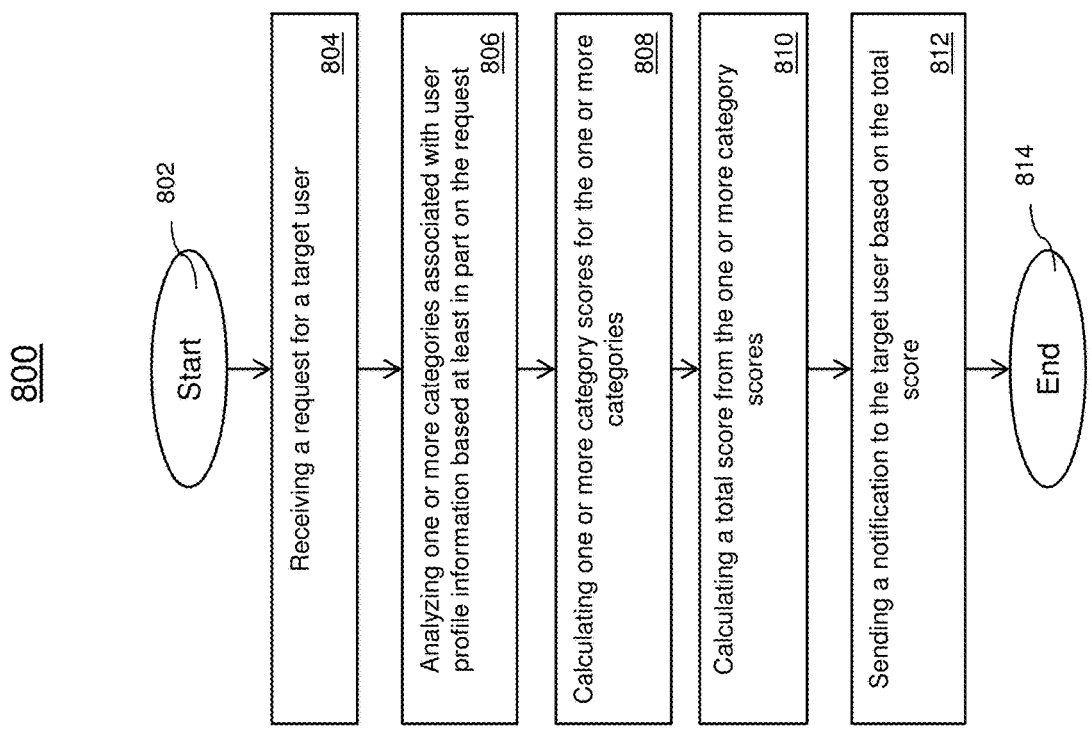
FIG. 8 depicts a flowchart for performing detection of genuine social media profiles in accordance with one or more embodiments of the invention.

Now referring to FIG. 8, a flowchart of a method 800 in accordance with one or more embodiments is shown. The method 800 begins at block 802 and proceeds to block 804 which provides for receiving, by a processor, a request for a target user. The method 800, at block 806 provides for analyzing one or more categories associated with user profile information based at least in part on the request. At block 808, the method 800 includes calculating one or more category scores for the one or more categories. Block 810 provides for calculating a total score from the one or more category scores. Block 812 provides for sending a notification to the target user based on the total score. The method 800 ends at block 814.

Referring now to FIG. 9, a computer program product 900 in accordance with an embodiment that includes a computer-readable storage medium 902 and program instructions 904 is generally shown.

The techniques described herein provide for detecting the likelihood that a social media profile is fraudulent or not a genuine user account. Upon the determination, the social media platform can present the results to the user before the user accepts an invite or request which provides a level of protection to the user's data.

The technological contribution includes increasing user confidence in using social media platforms by providing a level of trustworthiness between users. The techniques described herein provide for authenticating a user.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for performing a detection of genuine social media profiles, the computer-implemented method comprising:
receiving from a requesting user, by a processor, a request for a target user;

responsive to receiving the request from the requesting user, analyzing one or more categories associated with user profile information of at least one of the requesting user or the target user based at least in part on the request;

calculating one or more category scores for the one or more categories, wherein the one or more category scores comprises a post sub-category score, wherein calculating the post sub-category score comprises:

obtaining posts from a requesting user profile of the requesting user;

comparing the obtained posts of the requesting user to user profile information for the target user, wherein the requesting user is different than the requesting user;

calculating a total score from the one or more category scores; and providing a notification to the target user based on the total score prior to the user accepting the request.

2. The computer-implemented method of claim 1, further comprising:

determining an incoming/outgoing activity ratio of the requesting user; and calculating an activity category score based on the activity ratio.

3. The computer-implemented method of claim 1, further comprising:

determining a friend set of the requesting user;

comparing the friend set with the user profile information of the requesting user; and calculating a friend sub-category score based on the comparison.

4. The computer-implemented method of claim 1, further comprising:

determining a friend set of the requesting user;

comparing the friend set of the requesting user with a friend set of the target user; and calculating a friend sub-category score based on the comparison.

5. The computer-implemented method of claim 1, further comprising:

obtaining posts of the requesting user;

determining if the obtained posts are flagged based at least in part on content of the obtained posts; and calculating the post sub-category score is further based on a number of flagged posts.

6. The computer-implemented method of claim 1, further comprising weighting one or more category scores and one or more sub-category scores to calculate the total score.

7. The computer-implemented method of claim 1, further comprising generating a report, wherein the report includes at least one of the total score and one or more factors contributing to the total score.

8. A system for performing a detection of genuine social media profiles, the system comprising:

a storage medium, the storage medium being coupled to a processor;

the processor configured to:

receive a request from a requesting user for a target user;

responsive to receiving the request from the requesting user, analyze one or more categories associated with user profile information of at least one of the requesting user or the target user based at least in part on the request;

calculate one or more category scores for the one or more categories, wherein the one or more category scores comprises a post sub-category score, wherein calculating the post sub-category score comprises:

obtain posts from a requesting user profile of the requesting user;

compare the obtained posts of the requesting user to user profile information for the target user, wherein the requesting user is different than the requesting user;

calculate a total score from the one or more category scores; and provide a notification to the target user based on the total score prior to the user accepting the request.

9. The system of claim 8, wherein the processor is further configured to:

determine an incoming/outgoing activity ratio of the requesting user; and calculate an activity category score based on the activity ratio.

10. The system of claim 8, wherein the processor is further configured to:

determine a friend set of the requesting user;

compare the friend set with the user profile information of the requesting user; and calculate a friend sub-category score based on the comparison.

11. The system of claim 8, wherein the processor is further configured to:

determine a friend set of the requesting user;

compare the friend set of the requesting user with a friend set of the target user; and calculate a friend sub-category score based on the comparison.

12. The system of claim 8, wherein the processor is further configured to:

obtain posts of the requesting user;

determine if the obtained posts are flagged based at least in part on content of the obtained posts; and calculate the post sub-category score is further based on a number of flagged posts.

13. The system of claim 8, wherein the processor is further configured to weight one or more category scores and one or more sub-category scores to calculate the total score.

14. The system of claim 8, wherein the processor is further configured to generate a report, wherein the report includes at least one of the total score and one or more factors contributing to the total score.

15. A computer program product for performing detection of genuine social media profiles, the computer program product comprising a computer-readable storage medium having program instructions embodied therewith, the program instructions executable by a processor to cause the processor to:

receive a request for a target user;

responsive to receiving the request from the requesting user, analyze one or more categories associated with user profile information of at least one of the requesting user or the target user based at least in part on the request;

calculate one or more category scores for the one or more categories, wherein the one or more category scores comprises a post sub-category score, wherein calculating the post sub-category score comprises:

obtain posts from a requesting user profile of the requesting user;

compare the obtained posts of the requesting user to user profile information for the target user to calculate a first post sub-category score, wherein the requesting user is different than the requesting user;

determine if the obtained posts are flagged based at least in part on content of the obtained posts from the requesting user profile to calculate a second post sub-category score;

calculate a total score from the one or more category scores; and provide a notification to the target user based on the total score prior to the user accepting the request.

16. The computer program product of claim 15, wherein the instructions are further executable by the processor to cause the processor to:

determine an incoming/outgoing activity ratio of the requesting user; and calculate an activity category score based on the activity ratio.

17. The computer program product of claim 15, wherein the instructions are further executable by the processor to cause the processor to:

determine a friend set of the requesting user;

compare the friend set with the user profile information of the requesting user to calculate a first friend sub-category score; and compare the friend set of the requesting user with a friend set of the target user to calculate a second friend sub-category score.

* * * * *